US012675871B2

(12) United States Patent
Chen et al.

(10) Patent No.: US 12,675,871 B2
(45) Date of Patent: Jul. 7, 2026

(54) ZERO-SHOT REFERRING SEGMENTATION FOR DEFECT DETECTION IN VISUAL INSPECTION WITH LLM-GENERATED PROMPTS

(71) Applicant: SAP SE, Walldorf (DE)

(72) Inventors: Xinyan Chen, Singapore (SG); Yinan He, Singapore (SG); Rajesh Vellore Arumugam, Singapore (SG); Anantharaman Ravi, Singapore (SG)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 18/582,802

(22) Filed: Feb. 21, 2024

(65) Prior Publication Data

US 2025/0265700 A1     Aug. 21, 2025

(51) Int. Cl.
*G06T 7/00*        (2017.01)
*G06F 40/40*      (2020.01)
*G06T 7/10*        (2017.01)

(52) U.S. Cl.
CPC .............. *G06T 7/001* (2013.01); *G06F 40/40* (2020.01); *G06T 7/10* (2017.01); *G06T 2207/30108* (2013.01)

(58) Field of Classification Search
CPC ......... G06T 2207/30108; G06T 7/0008; G06T 7/001; G06T 7/10; G06T 7/11;
(Continued)

(56) References Cited

U.S. PATENT DOCUMENTS 12,518,352 B2 * 1/2026 Ramesh ................... G06T 5/60
2020/0364842 A1 11/2020 Chaton
(Continued)

FOREIGN PATENT DOCUMENTS

CN       114764765       7/2022
CN       116468725       9/2023
(Continued)

OTHER PUBLICATIONS

H. Deng, Y. Guo, Z. Xu and Y. Kang, "PTMNet: Pixel-Text Matching Network for Zero-Shot Anomaly Detection," 2023 9th International Conference on Big Data and Information Analytics (BigDIA), Haikou, China, 2023, pp. 781-787, doi: 10.1109/ BigDIA60676.2023.10429521 (Year: 2023).*
(Continued)

*Primary Examiner* — Michael Robert Cammarata
(74) *Attorney, Agent, or Firm* — Fish & Richardson P.C.

(57)               ABSTRACT
Methods, systems, and computer-readable storage media for receiving a product image depicting a product that is to-be-inspected for defects, transmitting a request to a LLM system, the request including the product image and a reference image, receiving, from the LLM system, a textual response, the textual response being generated by the LLM system at least partially by processing the product image and the reference image, processing the textual response and the product image through a RIS model to provide an output image that includes one or more masks, each mask indicating a defect in a product depicted in the product image, and providing the output image with an indication that the product is defective.

20 Claims, 4 Drawing Sheets

(58) Field of Classification Search
CPC ........... G06T 2207/20081; G06T 2207/20084; G06V 20/70; G06V 10/82

See application file for complete search history.

(56) References Cited

U.S. PATENT DOCUMENTS

| | | |
|---|---|---|
| 2024/0020954 A1 | 1/2024 | Kelkar et al. |
| 2024/0062362 A1 | 2/2024 | Wang et al. |
| 2024/0273374 A1 | 8/2024 | Lee et al. |
| 2025/0119624 A1 | 4/2025 | Oh et al. |
| 2025/0252554 A1 | 8/2025 | He et al. |
| 2025/0265700 A1* | 8/2025 | Chen ..................... G06T 7/0008 |
| 2025/0297566 A1 | 9/2025 | Rouet-Leduc |

FOREIGN PATENT DOCUMENTS

| | | | | |
|---|---|---|---|---|
| CN | 116468725 B | * | 9/2023 | ........... G06T 7/0004 |
| CN | 116703874 A | * | 9/2023 | |
| CN | 116993976 A | * | 11/2023 | ............ G06V 10/26 |
| EP | 4123506 | | 1/2023 | |
| WO | WO 2022119870 | | 6/2022 | |
| WO | WO 2022161974 | | 8/2022 | |

OTHER PUBLICATIONS

Li, Ruiyu, et al. "Referring image segmentation via recurrent refinement networks." Proceedings of the IEEE Conference on Computer Vision and Pattern Recognition. 2018. (Year: 2018).*

Zhang, Zhe, et al. "Combined anomaly aware weakly supervised lightweight model for surface defect inspection." IEEE Transactions on Industrial Informatics 20.4 (2024): 6652-6663. (Year: 2024).*

Zhang, Jiangning, et al. "Gpt-4v-ad: Exploring grounding potential of vqa-oriented gpt-4v for zero-shot anomaly detection." International Joint Conference on Artificial Intelligence. Singapore: Springer Nature Singapore, 2024. (Year: 2024).*

Chen, Xuhai, Yue Han, and Jiangning Zhang. "A zero-/few-shot anomaly classification and segmentation method for CVPR 2023 (VAND) workshop challenge tracks 1 &2." 1st Place on Zero-shot AD and 4th Place on Few-shot AD 2305 (2023): 17382. (Year: 2023).*

F. Liu et al., "Referring Image Segmentation Using Text Supervision," 2023 IEEE/CVF International Conference on Computer Vision (ICCV), Paris, France, 2023, pp. 22067-22077, doi: 10.1109/ICCV51070.2023.02022. (Year: 2023).*

D. Shan and Y. Zhang, "Human-Machine Hybrid Strategy for Defect Semantic Segmentation With Limited Data," in IEEE Trans-actions on Instrumentation and Measurement, vol. 73, pp. 1-15, 2024, Art No. 2504315, doi: 10.1109/TIM.2023.3341105. (Year: 2024).*

X. Tao, X. Gong, X. Zhang, S. Yan and C. Adak, "Deep Learning for Unsupervised Anomaly Localization in Industrial Images: A Survey," in IEEE Transactions on Instrumentation and Measurement, vol. 71, pp. 1-21, 2022, Art No. 5018021, doi: 10.1109/TIM.2022.3196436. (Year: 2022).*

D. -J. Chen, S. Jia, Y. -C. Lo, H. -T. Chen and T. -L. Liu, "See-Through-Text Grouping for Referring Image Segmentation," 2019 IEEE/CVF International Conference on Computer Vision (ICCV), Seoul, Korea (South), 2019, pp. 7453-7462, doi: 10.1109/ICCV .2019.00755. (Year: 2019).*

S. Yu, P. H. Seo and J. Son, "Zero-shot Referring Image Segmentation with Global-Local Context Features," 2023 IEEE/CVF Conference on Computer Vision and Pattern Recognition (CVPR), Vancouver, BC, Canada, 2023, pp. 19456-19465, doi: 10.1109/CVPR52729.2023.01864. (Year: 2023).*

Wang, Tao. "Learning to detect and segment for open vocabulary object detection." Proceedings of the IEEE/CVF Conference on Computer Vision and Pattern Recognition. 2023. (Year: 2023).*

Jeong, Jongheon, et al. "Winclip: Zero-/few-shot anomaly classification and segmentation." Proceedings of the IEEE/CVF Conference on Computer Vision and Pattern Recognition. 2023. (Year: 2023).*

U.S. Appl. No. 18/433,673, He et al., filed Feb. 6, 2024.

U.S. Appl. No. 18/969,362, Mishra et al., filed Dec. 5, 2024.

Brown et al., "Language models are few-shot learners" Advances in neural information processing systems 33, 2020, 25 pages.

Extended European Search Report in European Appln. No. 25155829. 2, mailed on May 23, 2025, 9 pages.

Ho et al., "Denoising diffusion probabilistic models" Advances in neural information processing systems, 33, 2020, 12 pages.

Huang et al., "Image difference captioning with instance-level fine-grained feature representation." IEEE transactions on multimedia 24, Apr. 2021, 2004-2017.

Pathak et al., "Context encoders: Feature learning by inpainting" In Proceedings of the IEEE conference on computer vision and pattern recognition, 2016, 2536-2544.

Reimers et al., "Sentence-bert: Sentence embeddings using siamese bert-networks" CoRR, Submitted on Aug. 2019, arXiv:1908. 10084v1, 11 pages.

Extended European Search Report in European Appln. No. 25152989. 7, mailed on Jul. 1, 2025, 6 pages.

Niu et al., "Defect image sample generation with GAN for improving defect recognition." IEEE Transactions on Automation Science and Engineering 17.3, Jul. 2020, 1611-1622.

* cited by examiner

ZERO-SHOT REFERRING SEGMENTATION FOR DEFECT DETECTION IN VISUAL INSPECTION WITH LLM-GENERATED PROMPTS

BACKGROUND

Defect detection is performed in manufacturing processes in an effort to ensure that defective products do not make it to market. With the development of computer vision techniques, automatic visual inspection is enabled through the user of machine learning (ML) models. For example, defect detection models can be trained on visual inspection (VI) datasets to identify classes (e.g., types) and locations of defects on products. However, traditional defect detection models need to be trained on relatively large, labeled datasets. Such datasets are both time- and resource-consuming (in terms of consumption of technical resource) to obtain. Further, representation of defects (not to mention multiple types of defects) are often lacking in such datasets, because defects (particularly, certain types of defects) are relatively rare. It can also be noted that training a defect detection model is itself a resource-intensive task, which can consume significant amounts of memory, processing, and energy.

SUMMARY

Implementations of the present disclosure are directed to a defect detection system that uses a referring image segmentation (RIS) model and a textual priori provided from a prompt that is generated by a large language model (LLM). More particularly, implementations of the present disclosure are directed to automated visual inspection of products for defects using an LLM system to provide a textual response and processing the textual response and a product image through a RIS model to provide an output image that includes one or more masks, each mask indicating a location of a defect in a product depicted in the product image.

In some implementations, actions include receiving a product image depicting a product that is to-be-inspected for defects, transmitting a request to a LLM system, the request including the product image and a reference image, receiving, from the LLM system, a textual response, the textual response being generated by the LLM system at least partially by processing the product image and the reference image, processing the textual response and the product image through a RIS model to provide an output image that includes one or more masks, each mask indicating a defect in a product depicted in the product image, and providing the output image with an indication that the product is defective. Other implementations of this aspect include corresponding systems, apparatus, and computer programs, configured to perform the actions of the methods, encoded on computer storage devices.

These and other implementations can each optionally include one or more of the following features: the request to the LLM system further includes a prompt requesting the LLM system to describe any differences between the product image and the reference image; the RIS model is provided as a pre-trained model; actions further include executing zero-shot learning of the RIS model using one or more of labeled training images and unlabeled training images; actions further include providing one or more labels with the output image, each label indicating a respective defect type; processing the textual response and the product image through a RIS model to provide an output image is executed in response to determining that the textual response from the LLM system indicates a difference between the product image and the reference image; and the LLM system executes a LLM that is enabled to analyze visual inputs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
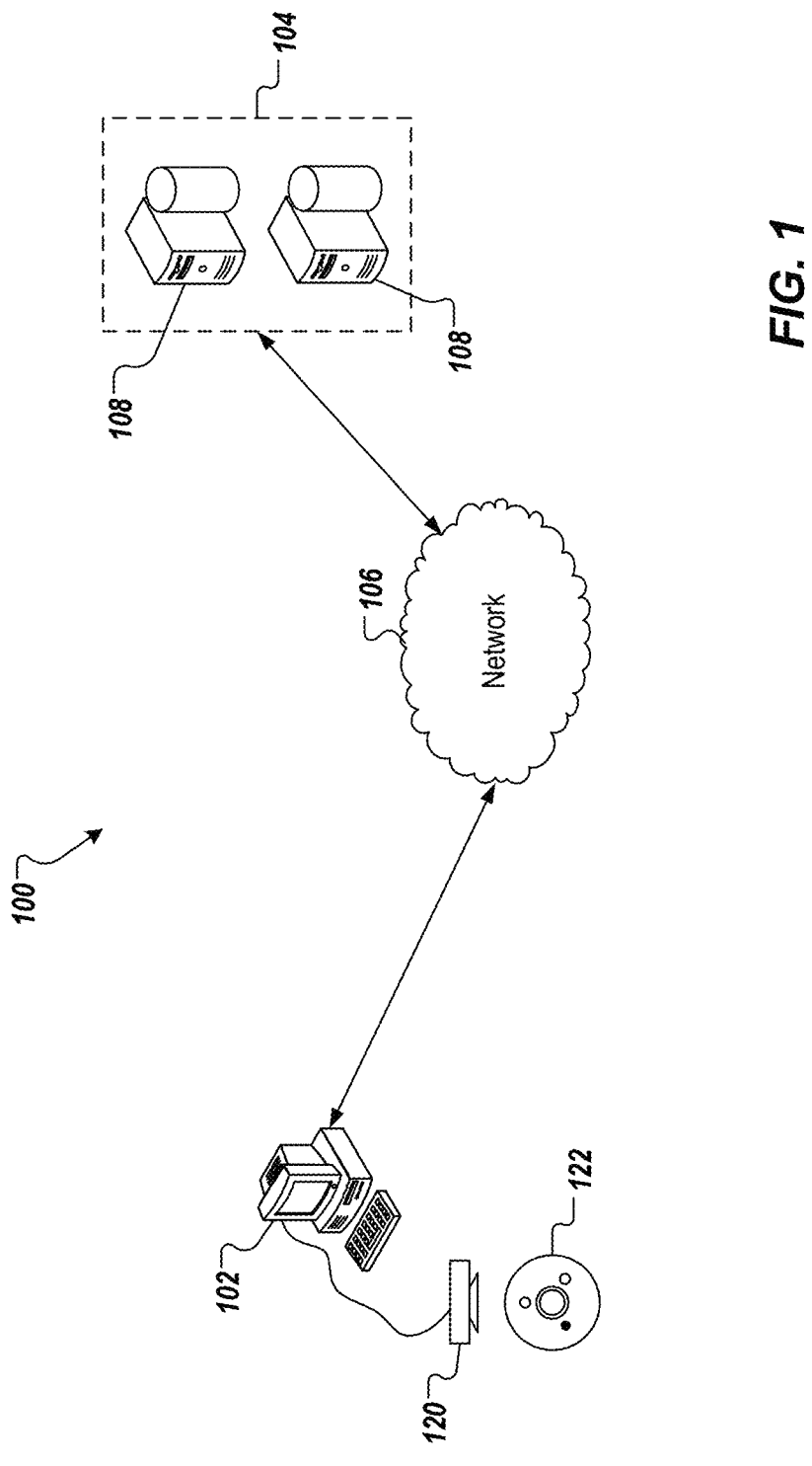
FIG. 1 depicts an example architecture that can be used to execute implementations of the present disclosure.

Implementations of the present disclosure are directed to a defect detection system that uses a referring image segmentation (RIS) model and a textual priori provided from a prompt that is generated by a large language model (LLM). More particularly, implementations of the present disclosure are directed to automated visual inspection of products for defects using an LLM system to provide a textual response and processing the textual response and a product image through a RIS model to provide an output image that includes one or more masks, each mask indicating a location of a defect in a product depicted in the product image.

Implementations can include actions of receiving a product image depicting a product that is to-be-inspected for defects, transmitting a request to a LLM system, the request including the product image and a reference image, receiving, from the LLM system, a textual response, the textual response being generated by the LLM system at least partially by processing the product image and the reference image, processing the textual response and the product image through a RIS model to provide an output image that includes one or more masks, each mask indicating a defect in a product depicted in the product image, and providing the output image with an indication that the product is defective.

To provide further context for implementations of the present disclosure, and as introduced above, defect detection is performed in manufacturing processes in an effort to ensure that defective products do not make it to market. Defect detection can be described as the problem of identifying, localizing, and categorizing defective areas on the products and is typically performed in a visual inspection phase of supply chains. Visual inspection can be described as the process of inspecting products in a production line to identify defects for quality control.

With the development of computer vision techniques, automatic visual inspection is enabled through the user of machine learning (ML) models, such as deep neural networks (DNNs). For example, defect detection models can be trained on visual inspection (VI) datasets to identify classes (e.g., types) and locations of defects on products. Here, VI datasets include images of products that can be labeled for training (e.g., defective, non-defective). However, traditional defect detection models need to be trained on relatively large, labeled datasets. Such datasets are both time- and resource-consuming (in terms of consumption of technical resource) to obtain. Further, representation of defects (not to mention multiple types of defects) are often lacking in such datasets, because defects (particularly, certain types of defects) are relatively rare. It can also be noted that training a defect detection model is itself a resource-intensive task, which can consume significant amounts of memory, processing, and energy.

In some approaches, end-to-end computer vision object detection and segmentation models can be implemented. While such object detection and segmentation models are relatively easy to implement in the VI context, there are multiple drawbacks. For example, object detection and segmentation models also require relatively large, labeled datasets as well as resource-intensive training. More particularly, object detection and segmentation models can be trained using a fully supervised learning strategy, which requires users to provide a well-labeled datasets that include both images of non-defective produces and images of defective products and their corresponding bonding boxes or segmentation masks. Further, due to a lack of prior knowledge, the object detection and segmentation models need to process the whole image to localize any defects and propose regions of interest (ROIs) for further investigation. In most VI cases, a defect on a product only occupies a small area. However, the object detection and segmentation model needs to recursively go through the ROI proposal process to finalize the location of the defect. Such a process incurs high computational costs and inference results can be imprecise.

In view of the above context, implementations of the present disclosure provide a defect detection system that uses a LLM system and a referring image segmentation (RIS) model for defect detection and identification. More particularly, and as described in further detail herein, the defect detection system of the present disclosure uses an LLM system to provide a textual response based on a reference image and a product image of a product that is to-be-inspected. The textual response and the product image are processed by a RIS model, the textual response being used as a textual priori for localizing ROI search in the product image. The RIS model provides an output image that includes one or more masks, each mask indicating a location of a defect.

FIG. 1 depicts an example system 100 that can execute implementations of the present disclosure. The example system 100 includes a computing device 102, a back-end system 104, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 104 includes at least one server system 108 (e.g., with a data store). In some examples, the at least one server system 108 hosts one or more computer-implemented services that users can interact with using computing devices. For example, the server system 108 can host a defect detection system in accordance with implementations of the present disclosure.

In the example of FIG. 1, a camera 120 and an object 122 are depicted. The camera 120 can by any appropriate type of camera (e.g., video camera) that generates images representing objects, such as the object 122. In the context of the present disclosure, the camera 120 can generate images as digital data representing the object 122. The object 122 can be a product that is being inspected for any defects. The camera 120 can capture images of every side of the object 122, such as front, back, left, right, top, and bottom sides of the object 122. In some examples, multiple cameras 120 installed in different angles can be provided to capture images of every side of the object 122. In some examples, the object 122 can be rotated, so that the camera 120 can capture images of every side of the object 122.

In accordance with implementations, images can be processed by a defect detection system to determine whether the object 122, as represented within the image(s), includes any defects. In some examples, the defect detection system is executed on the computing device 102. In some examples, the defect detection system is executed in the back-end system 104. As described in further detail herein, the defect detection system uses an LLM system to provide a textual response based on a reference image and a product image of a product that is to-be-inspected. The textual response and the product image are processed by a RIS model, the textual response being used as a textual priori for localizing ROI search in the product image. The RIS model provides an output image that includes one or more masks, each mask indicating a location of a defect.

Figure 2:
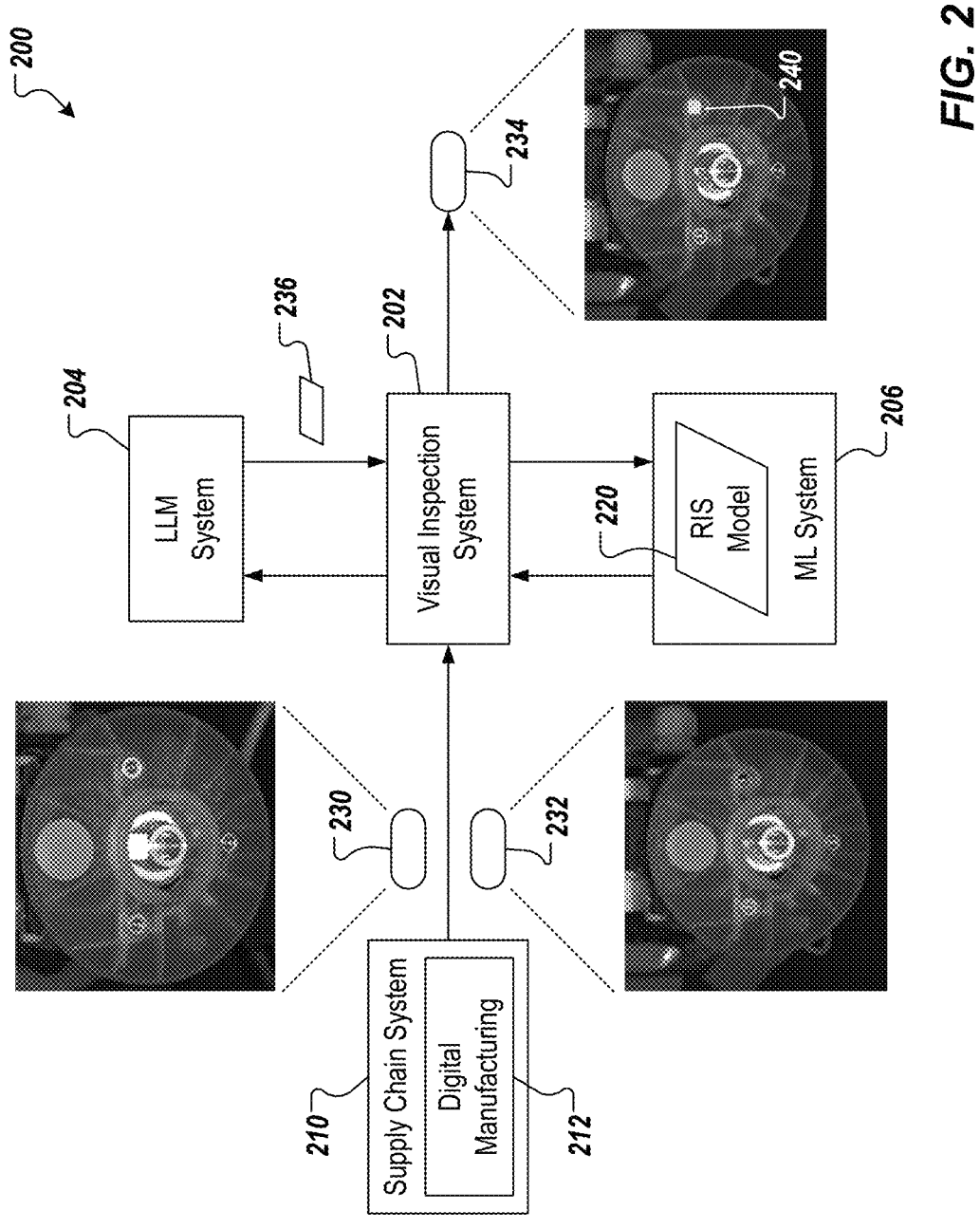
FIG. 2 depicts an example conceptual architecture for a defect detection system in accordance with implementations of the present disclosure.

FIG. 2 depicts an example conceptual architecture 200 for a defect detection system in accordance with implementations of the present disclosure. In the depicted example, conceptual architecture 200 includes a visual inspection system 202, a LLM system 204, a ML system 206, and a supply chain system 210 that includes a digital manufacturing sub-system 212. An example supply chain system can include, without limitation, SAP Supply Chain Management (SCM) provided by SAP SE of Walldorf, Germany.

The ML system 206 executes a RIS model 220, as described in further detail herein. In general, a RIS model can be described as a ML model that is trained to segment target objects from an input image responsive to a linguistic query provided as a textual prompt. In some examples, the RIS model 220 is provided as a zero-shot referring image segmentation (ZSRIS) model. In general, a ZSRIS model can be described as a RIS model that uses a mask-guided visual encoder to capture global and local contextual information of an input image. Although the ML system 206 is depicted separate from the visual inspection system 202, it is contemplated that the ML system 206 can be incorporated as part of the visual inspection system 202.

As described in further detail herein, the visual inspection system 202 processes a reference image 230 and a product image 232 to provide an output image 234. In some examples, the reference image 230 depicts a sample of a product that is absent any defects (e.g., an image of the product from a standard product database). In some examples, the product image 232 depicts a product that is to-be-inspected for any defects (e.g., a product moving down or exiting an assembly line). In some examples, if the product that is to-be-inspected includes a defect, the output image 234 depicts the product with one or more masks, each mask depicting an area of a defect.

In further detail, the visual inspection system 202 receives the reference image 230 and the product image 232. The visual inspection system 202 transmits a request to the LLM system 204 to request a description of any differences between the reference image 230 and the product image 232. In some examples, the request includes a prompt, the reference image 230, and the product image 232. In some examples, the prompt can includes a textual prompt, such as:

Given [IMG_1], find what is wrong with [IMG_2].

In this example, [IMG_1] can be the filename of the reference image 230 and [IMG_2] can be the filename of the product image 232 provided in the request. In accordance with implementations of the present disclosure, the LLM system 204 returns a textual response 236 to the request. In some examples, the textual response 236 describes any differences between the images submitted with the request, as discussed in further detail herein.

In some implementations, the LLM system 204 is provided as a third-party system that executes a LLM that is responsive to requests. For example, a request can be submitted to the LLM system 204 through an application programming interface (API). An example LLM can include, without limitation, GPT-4 with vision (GPT-4V) provided by OpenAI OpCo, LLC ("OpenAI"). GPT-4V can be describes as enabling GPT-4 (a LLM provide by OpenAI) to be instructed to analyze image inputs.

In the non-limiting example of FIG. 2, the product is provided as a valve head assembly and the product image 232 depicts a sample of the product that is missing a fastener. In response to the request including the prompt, the reference image 230, and the product image 232, the LLM system 204 can return the following example, non-limiting response to the visual inspection system 202:

In [IMG_2] there is a small hole on the right side of the product. This could be a missing fastener defect.

In the example above, the LLM system 204 includes a prediction of a defect type (e.g., missing fastener).

In some implementations, the visual inspection system 202 can selectively send a request to the ML system 206. In examples, the visual inspection system 202 can determine whether the textual response 236 indicates a difference between the reference image 230 and the product image 232. For example, the textual response 236 can be processed through a classifier (e.g., natural language processing (NLP) model), which provides an output that indicates whether the textual response 236 indicates a difference. In some examples, if the textual response 236 does not indicate a difference, the visual inspection system 202 determines that there is no defect and can indicate non-defective. For example, the visual inspection system 202 can provide an indication that the product depicted in the product image 232 is non-defective (e.g., record in a data log, transmit a message). If the textual response 236 indicates a difference, the visual inspection system 202 can send a request to the ML system 206.

In some examples, the request includes the product image 232 and the textual response 236. Here, the textual response 236 functions as a prompt to the RIS model 220 as a textual priori. In this manner, the textual priori enables the RIS model 220 to localize any defects in a computationally efficient manner. That is, because the textual priori indicates location(s) of any defect(s), the RIS model 220 is provided with a rough searching area within the product image 232 to identify ROI(s). In this manner, the RIS model 220 need not search the entirety of the product image 232.

In some implementations, the RIS model 220 includes a mask generator, a visual feature extractor, a key none phrase extractor, and a textual feature extractor. In some examples, the mask generator and key none phrase extractor are provided as pre-trained models (e.g., FreeSOLO, spaCy). In some examples, the visual feature extractor and the textual feature extractor are also pre-trained models that are fine-tuned for the specific use case. For fine-tuning, specific sample images in user cases and corresponding text description for each image are used as training data. The objective of the model training process is to make the distance between visual features and textual features as close as possible. Thus, training of the visual feature extractor and the textual feature extractor includes, for each training sample, simultaneously inputting the image into the visual feature extractor and the textual feature extractor. After obtaining both visual features and textual features (which are vector embeddings), an error (e.g., mean square error (MSE)) between the vectors is determined and is used as the training loss function to optimize both the visual feature extractor and the textual feature extractor.

In further detail, the RIS model 220 processes the textual response 236 to extract keywords and global textual representations and processes the product image 232 to extract local and global information. More particularly, to process the visual input (the product image 232), the RIS model 220 uses an unsupervised mask generator to generate a set of mask proposals, and extracts both global features and local features for each mask proposal. To process textual input (the textual response 236), the RIS model 220 extracts global textual representations with a contrastive language-image pre-training (CLIP) query encoder, and uses a dependency analyzer (e.g., spaCy) to extract key noun phrases within the sentence, and combines the global textual representations with the key noun phrase characteristics. The RIS model 220 uses a shared embedding space to learn both the visual and the textual representations.

By combining both visual and textual characteristics, the RIS model 220 can precisely identify and segment defective areas with resource efficiency, in terms of computational cost (e.g., not scanning the entirety of the product image 232). The RIS model 220 provides a mask over each pixel that represents an object class in question (e.g., small hole). To display a visible output that is easy to understand, the mask is combined with the product image 232 to provide the output image 234. As depicted in the non-limiting example of FIG. 2, the output image 234 includes a mask 240 that highlights the defect area. In some examples, a label can be provided for each mask depicted in the output image 234 that includes the defect type represented by the respective mask. In some examples, the label is provided from the prediction included in the textual response 236.

In further detail, referring image segmentation is a multi-modal segmentation task. Compared with traditional segmentation models, an improvement provided by the RIS model is to take textual input as the segmentation reference to segment out the indicated area. Typically, by introducing textual priori (e.g., the textual response 236), the RIS model is able to quickly and accurately perform segmentation. Zero-shot learning obviates the need for the time- and resource-consuming gathering and labeling of datasets for training.

Figure 3:
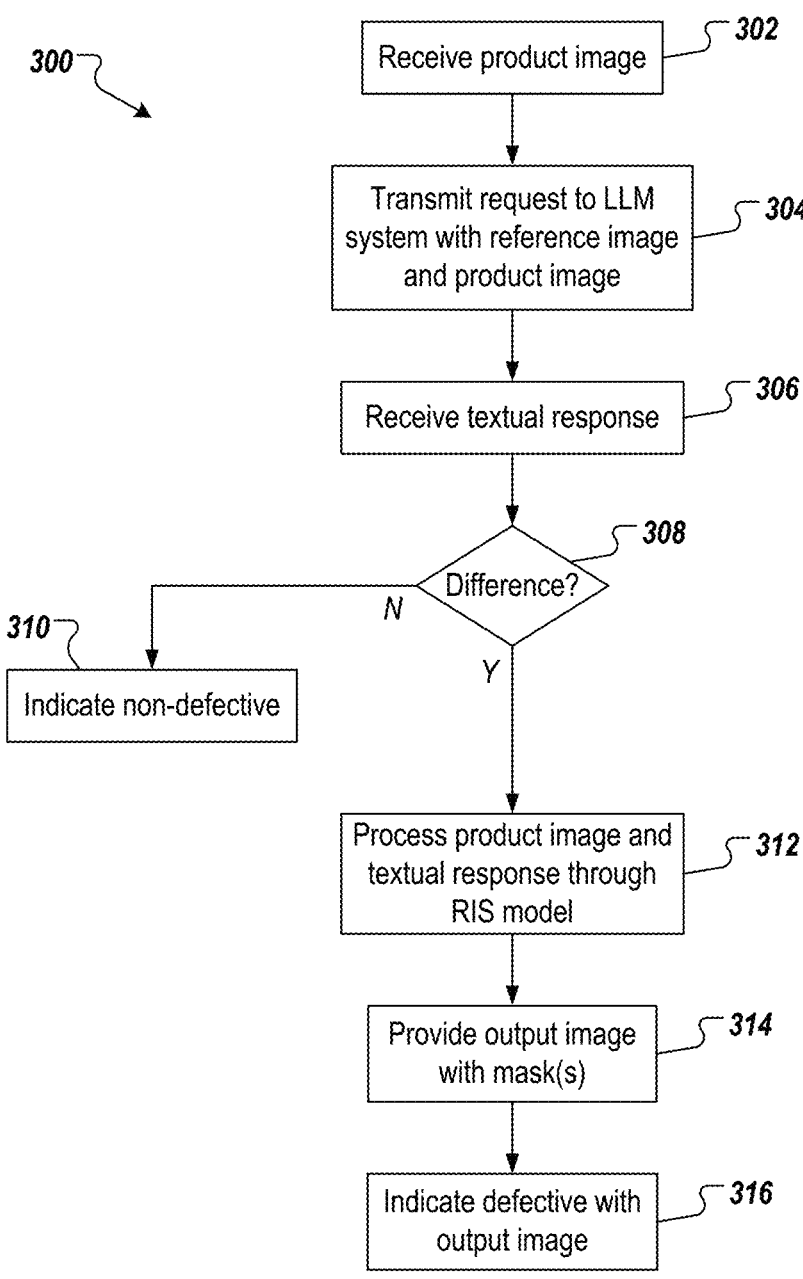
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A product image is received (302). For example, and as described in detail herein with reference to FIG. 2, the visual inspection system 202 receives the product image 232 from the supply chain system 210. In some examples, the product image 232 depicts a product that is to-be-inspected and is generated by a camera (e.g., the camera 120 of FIG. 1 generating a product image depicting the object 122). A request with a reference image and the product image is transmitted to a LLM system (304). For example, and as described in detail herein, the visual inspection system 202 transmits a request to the LLM system 204 (e.g., through an API) to request a description of any differences between the reference image 230 and the product image 232.

A textual response is received (306). For example, and as described in detail herein, the LLM system 204 processes a prompt (included in the request), the product image 232 and the reference image 230, and returns the textual response 236 responsive to the request. It is determined whether there is a difference between the reference image and the product image (308). For example, and as described in detail herein, the visual inspection system 202 can determine whether the textual response 236 indicates a difference between the reference image 230 and the product image 232 (e.g., the textual response 236 can be processed through a classifier). If there is no difference, the product is indicated as non-defective (310). For example, and without limitation, the visual inspection system 202 can record that the product depicted in the product image 232 is non-defective and/or issue a message indicating that the product depicted in the product image 232 is non-defective.

If there is a difference, the product image and the textual response are processed through a RIS model (312). For example, and as described in detail herein, the visual inspection system 202 can send a request to the ML system 206, the request including the product image 232 and the textual response 236, where the RIS model 220 processes the request. As described herein, the RIS model 220 processes the product image 232 using an unsupervised mask generator to generate a set of mask proposals, and extracts both global features and local features for each mask proposal, and processes the textual response 236 to extract global textual representations with a contrastive language-image pre-training (CLIP) query encoder, and uses a dependency analyzer (e.g., spaCy) to extract key noun phrases within the sentence. The RIS model 220 combines the global textual representations with the key noun phrase characteristics.

The RIS model 220 uses a shared embedding space to learn both the visual and the textual representations.

An output image depicting one or more masks is provided (314). For example, and as described in detail herein, the RIS model 220 merges the product image 232 with one or more masks to provide the output image 234. The product is indicated as defective with the output image (316). For example, and as described in detail herein, the visual inspection system 202 can provide the output image 234 with a message (e.g., an alert) indicating that the product depicted in the output image 234 is defective. In some examples, one or more labels are provided with the output image 234, each label indicating a respective defect type of a respective mask. For example, a label can be determined from a defect type provided in the textual response 236 (e.g., a label of "missing fastener").

Implementations of the present disclosure provide multiple technical advantages. For example, traditional defect detection models are trained using fully supervised learning with manually labeled training datasets. In contrast, use of the RIS model in accordance with the present disclosure obviates such intensive datasets and computationally expensive training process. Further, zero-shot learning of the RIS model enables a relatively small dataset of unlabeled images and/or a few labeled images to train the RIS model in a computationally efficient manner. As another example, traditional approaches require models to process every pixel of an image to propose multiple ROIs in an effort to identify and localize any defects, which is computationally expensive. By utilizing the textual response generated by the LLM system as a textual priori to the RIS model, the RIS model can limit processing of the image to the area(s) specified in the textual response, which greatly reduces the computational cost. Further, and compared to general semantic/instance/panoptic segmentation, RIS narrows down the segmentation target to a specific instance and can distinguish between different instances in the same category, which makes the segmentation result more accurate.

Figure 4:
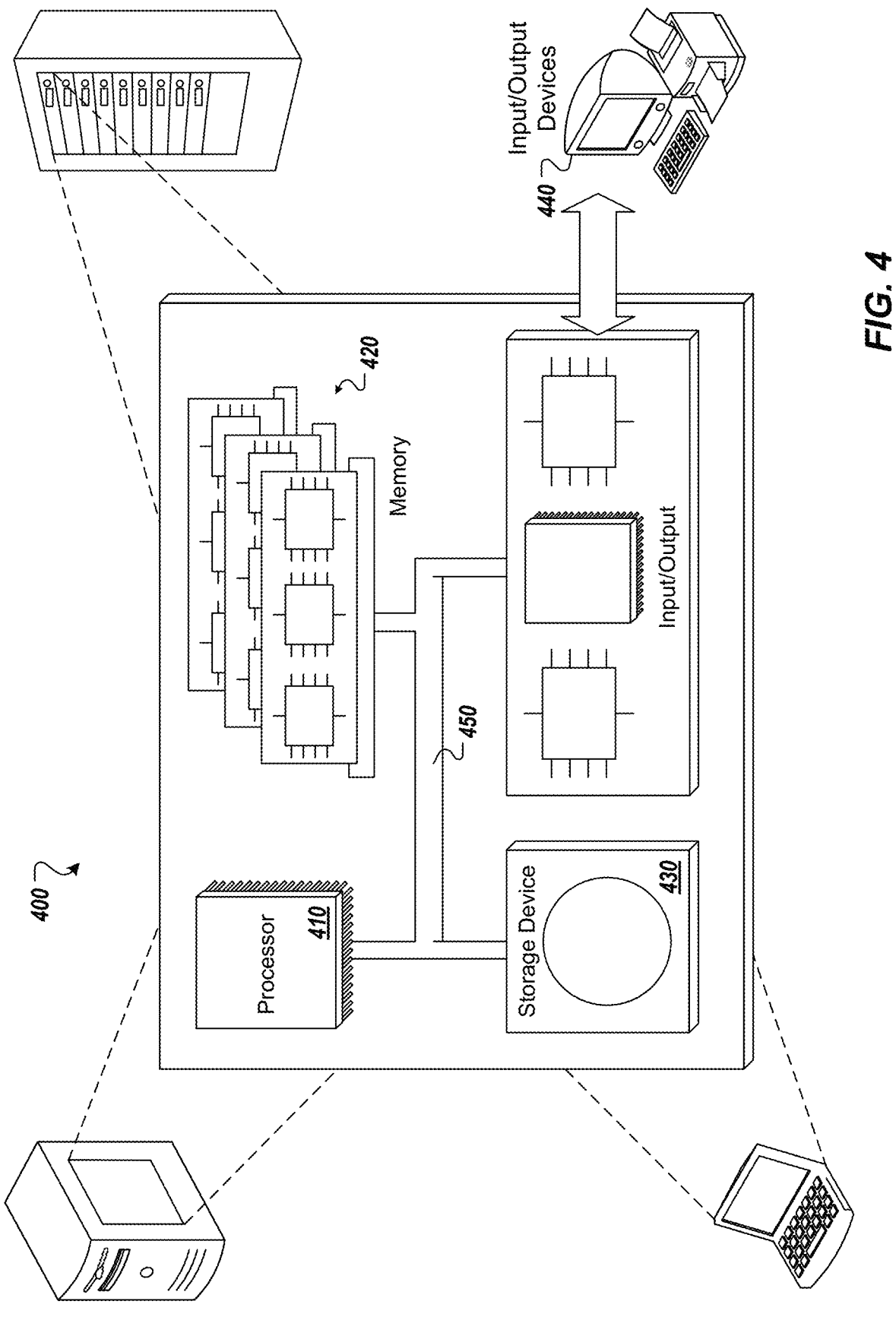
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automated visual inspection of products for defects, the method being executed by one or more processors and comprising:
   receiving a product image depicting a product that is to-be-inspected for defects;
   transmitting a request to a large language model (LLM) system, the request comprising the product image and a reference image;
   receiving, from the LLM system, a textual response, the textual response being generated by the LLM system at least partially by processing the product image and the reference image;
   processing the textual response and the product image through a referring image segmentation (RIS) model to provide an output image that includes one or more masks, each mask indicating a defect in a product depicted in the product image; and
   providing the output image with an indication that the product is defective.

2. The method of claim 1, wherein the request to the LLM system further comprises a prompt requesting the LLM system to describe any differences between the product image and the reference image.

3. The method of claim 1, wherein the RIS model is provided as a pre-trained model.

4. The method of claim 3, further comprising executing zero-shot learning of the RIS model using one or more of labeled training images and unlabeled training images.

5. The method of claim 1, further comprising providing one or more labels with the output image, each label indicating a respective defect type.

6. The method of claim 1, wherein processing the textual response and the product image through a RIS model to provide an output image is executed in response to determining that the textual response from the LLM system indicates a difference between the product image and the reference image.

7. The method of claim 1, wherein the LLM system executes a LLM that is enabled to analyze visual inputs.

8. A non-transitory computer-readable storage medium coupled to one or more processors and having instructions stored thereon which, when executed by the one or more processors, cause the one or more processors to perform operations for automated visual inspection of products for defects, the operations comprising:
   receiving a product image depicting a product that is to-be-inspected for defects;

transmitting a request to a large language model (LLM) system, the request comprising the product image and a reference image;

receiving, from the LLM system, a textual response, the textual response being generated by the LLM system at least partially by processing the product image and the reference image;

processing the textual response and the product image through a referring image segmentation (RIS) model to provide an output image that includes one or more masks, each mask indicating a defect in a product depicted in the product image; and providing the output image with an indication that the product is defective.

9. The non-transitory computer-readable storage medium of claim 8, wherein the request to the LLM system further comprises a prompt requesting the LLM system to describe any differences between the product image and the reference image.

10. The non-transitory computer-readable storage medium of claim 8, wherein the RIS model is provided as a pre-trained model.

11. The non-transitory computer-readable storage medium of claim 10, wherein operations further comprise executing zero-shot learning of the RIS model using one or more of labeled training images and unlabeled training images.

12. The non-transitory computer-readable storage medium of claim 8, wherein operations further comprise providing one or more labels with the output image, each label indicating a respective defect type.

13. The non-transitory computer-readable storage medium of claim 8, wherein processing the textual response and the product image through a RIS model to provide an output image is executed in response to determining that the textual response from the LLM system indicates a difference between the product image and the reference image.

14. The non-transitory computer-readable storage medium of claim 8, wherein the LLM system executes a LLM that is enabled to analyze visual inputs.

15. A system, comprising:

a computing device; and a computer-readable storage device coupled to the computing device and having instructions stored thereon which, when executed by the computing device, cause the computing device to perform operations for automated visual inspection of products for defects, the operations comprising:

receiving a product image depicting a product that is to-be-inspected for defects;

transmitting a request to a large language model (LLM) system, the request comprising the product image and a reference image;

receiving, from the LLM system, a textual response, the textual response being generated by the LLM system at least partially by processing the product image and the reference image;

processing the textual response and the product image through a referring image segmentation (RIS) model to provide an output image that includes one or more masks, each mask indicating a defect in a product depicted in the product image; and providing the output image with an indication that the product is defective.

16. The system of claim 15, wherein the request to the LLM system further comprises a prompt requesting the LLM system to describe any differences between the product image and the reference image.

17. The system of claim 15, wherein the RIS model is provided as a pre-trained model.

18. The system of claim 17, wherein operations further comprise executing zero-shot learning of the RIS model using one or more of labeled training images and unlabeled training images.

19. The system of claim 15, wherein operations further comprise providing one or more labels with the output image, each label indicating a respective defect type.

20. The system of claim 15, wherein processing the textual response and the product image through a RIS model to provide an output image is executed in response to determining that the textual response from the LLM system indicates a difference between the product image and the reference image.

* * * * *